United States Patent
Shah et al.

(10) Patent No.: US 7,167,859 B2
(45) Date of Patent: Jan. 23, 2007

(54) DATABASE SECURITY

(75) Inventors: Arun Shah, Saratoga, CA (US); Robert F. Novy, Redwood City, CA (US); Robert A. Ertl, Los Gatos, CA (US)

(73) Assignee: Hyperion Solutions Corporation, Santa Clara, CA (US)

( * ) Notice: Subject to any disclaimer, the term of this patent is extended or adjusted under 35 U.S.C. 154(b) by 689 days.

(21) Appl. No.: 09/844,717

(22) Filed: Apr. 27, 2001

(65) Prior Publication Data

US 2002/0016924 A1 Feb. 7, 2002

Related U.S. Application Data

(63) Continuation-in-part of application No. 09/837,114, filed on Apr. 17, 2001, now Pat. No. 6,662,174.

(60) Provisional application No. 60/199,975, filed on Apr. 27, 2000.

(51) Int. Cl.
G06F 7/00 (2006.01)
G06F 17/30 (2006.01)

(52) U.S. Cl. .............. 707/9; 707/2; 707/7; 707/9; 707/10; 726/27

(58) Field of Classification Search ............... 713/200; 707/202, 7, 100, 2, 9, 10; 726/27
See application file for complete search history.

(56) References Cited

U.S. PATENT DOCUMENTS 5,355,474 A * 10/1994 Thuraisngham et al. ....... 707/9
5,675,785 A * 10/1997 Hall et al. ................. 707/102
5,884,299 A 3/1999 Ramesh et al.
5,899,992 A 5/1999 Iyer et al.
5,905,985 A * 5/1999 Malloy et al. .............. 707/100
5,926,818 A 7/1999 Malloy
5,943,671 A * 8/1999 Kleewein et al. ............... 707/9
5,944,825 A * 8/1999 Bellemore et al. .......... 713/202
5,983,227 A 11/1999 Nazem et al.
5,991,756 A 11/1999 Wu
6,032,144 A 2/2000 Srivastava et al.
6,078,926 A 6/2000 Jensen et al.
6,161,103 A * 12/2000 Rauer et al. .................. 707/4
6,163,774 A 12/2000 Lore et al.
6,199,063 B1 3/2001 Colby et al.
6,205,469 B1 3/2001 Graham
6,212,515 B1 4/2001 Rogers
6,212,524 B1 * 4/2001 Weissman et al. .......... 707/101

(Continued)

FOREIGN PATENT DOCUMENTS

WO WO9957658 11/1999

(Continued)

*Primary Examiner*—Ayaz Sheikh
*Assistant Examiner*—Kaveh Abrishamkar
(74) *Attorney, Agent, or Firm*—Baker & McKenzie LLP

(57) ABSTRACT

Disclosed is a system, method, and apparatus for calculating metrics by using hierarchical level metadata to describe the various structures within the database. The hierarchical level metadata permit calculation of complex metrics by an analytical server which would otherwise be difficult or impossible. As a result of the way that the analytical server calculates the metrics, slicing and drilling are supported. Additionally, dimension and fact level security are also supported.

14 Claims, 7 Drawing Sheets

U.S. PATENT DOCUMENTS

| | | |
|---|---|---|
| 6,282,544 B1 | 8/2001 | Tse et al. |
| 6,327,574 B1 | 12/2001 | Kramer et al. |
| 6,366,922 B1 | 4/2002 | Althoff |
| 6,377,993 B1 | 4/2002 | Brandt et al. |
| 6,385,201 B1 | 5/2002 | Iwata |
| 6,385,604 B1 | 5/2002 | Bakalash et al. |
| 6,439,699 B1 | 8/2002 | Silverbrook |
| 6,446,063 B1 | 9/2002 | Chen et al. |
| 6,480,836 B1 | 11/2002 | Colby et al. |
| 6,484,179 B1 | 11/2002 | Roccaforte |
| 6,505,205 B1 | 1/2003 | Kothuri et al. |
| 6,542,895 B1 | 4/2003 | DeKimpe et al. |
| 6,556,983 B1 | 4/2003 | Alstchuler et al. |
| 6,581,054 B1 * | 6/2003 | Bogrett .................. 707/4 |
| 6,662,174 B2 * | 12/2003 | Shah et al. ............... 707/2 |
| 2002/0029207 A1 | 3/2002 | Bakalash et al. |
| 2002/0078018 A1 * | 6/2002 | Tse et al. .................. 707/1 |

FOREIGN PATENT DOCUMENTS

| | | |
|---|---|---|
| WO | WO0020982 | 4/2000 |

* cited by examiner

DATABASE SECURITY

RELATED APPLICATIONS

This application depends and claims priority from U.S. Provisional Patent Application No. 60/199,975 (filed Apr. 27, 2000), and patent application Ser. No. 09/837,114, filed Apr. 17, 2001, entitled "Analytical Server Including Metrics Engine", which are hereby incorporated by reference herein.

This application is a continuation-in-part of application Ser. No. 09/837,114 filed Apr. 17, 2001 now U.S. Pat. No. 6,662,174.

TECHNICAL FIELD

The embodiments disclosed and claimed herein are related to computer systems, and more particularly, databases.

TECHNICAL BACKGROUND

Today's businesses have sophisticated data analysis requirements. The metrics or analyses of a business's data can be difficult to obtain. To calculate a meaningful metric, business analysts often use spreadsheets to manually analyze data. Manual analysis, of course, is a tedious and time-consuming process.

Most applications fail to deliver useful metrics that provide unique insights into an organization's performance. Useful metrics highlight significant performance measures of the business. Typically, business analysts must execute multiple queries and other time-consuming manual interventions to produce these metrics. Then, despite the time-consuming effort, analysts must start the process anew to obtain follow-up information such as an explanation of a particular anomaly in a metric.

Typically, a business's data is stored on a database or on databases. These databases are operated with associated database servers, which manage the storage and retrieval of records from the databases. Analytical servers have additionally been provided to format database queries or information requests sent from a client user interface to the database server for handling. The analytical servers can be used to improve the efficiency of the database accesses and to provide metrics of interest to the user from the retrieved records from the database.

SUMMARY

The embodiments disclosed below provide an analytical server which efficiently accesses a Relational Database Management System ("RDBMS") comprising a database and a database server. The database in this approach includes fact and dimension tables which may be, for example, configured in a star schema having a central base_fact table with surrounding dimension tables to form the star structure. Aggregate_fact tables may also be provided which aggregate measures from the base_fact table at a higher hierarchical level than such measures are maintained in the base_fact table. Metadata is further stored in the database, where the metadata describes the organization of the various tables in the database, and specifically the metadata in the embodiments described below includes information about the hierarchical levels of various dimensions of the above-mentioned tables and star schema.

With further reference to the metadata stored in the database in the below-described embodiments, the analytical server described herein receives the metadata from the database and analyzes that metadata, including the hierarchical information, in order to provide relatively efficient access to the tables of the database in response to a query from a user. Such efficient access preferably supports calculation of complex metrics which might otherwise be difficult or impossible. Supported levels of stars are defined and analyzed in a sophisticated and efficient manner which facilitates the calculation of chameleon and allocated metrics.

The foregoing provides a number of additional advantages. A user can easily limit the data to a particular set of value(s) for a particular hierarchy level, known as slicing. The user can also view the metrics by moving up or down through a hierarchy, known as drilling. Additionally, fact level security and dimensional security are supported, as well as efficient collection and analysis of aggregate_fact table usage statistics.

DETAILED DESCRIPTION

Figure 1:
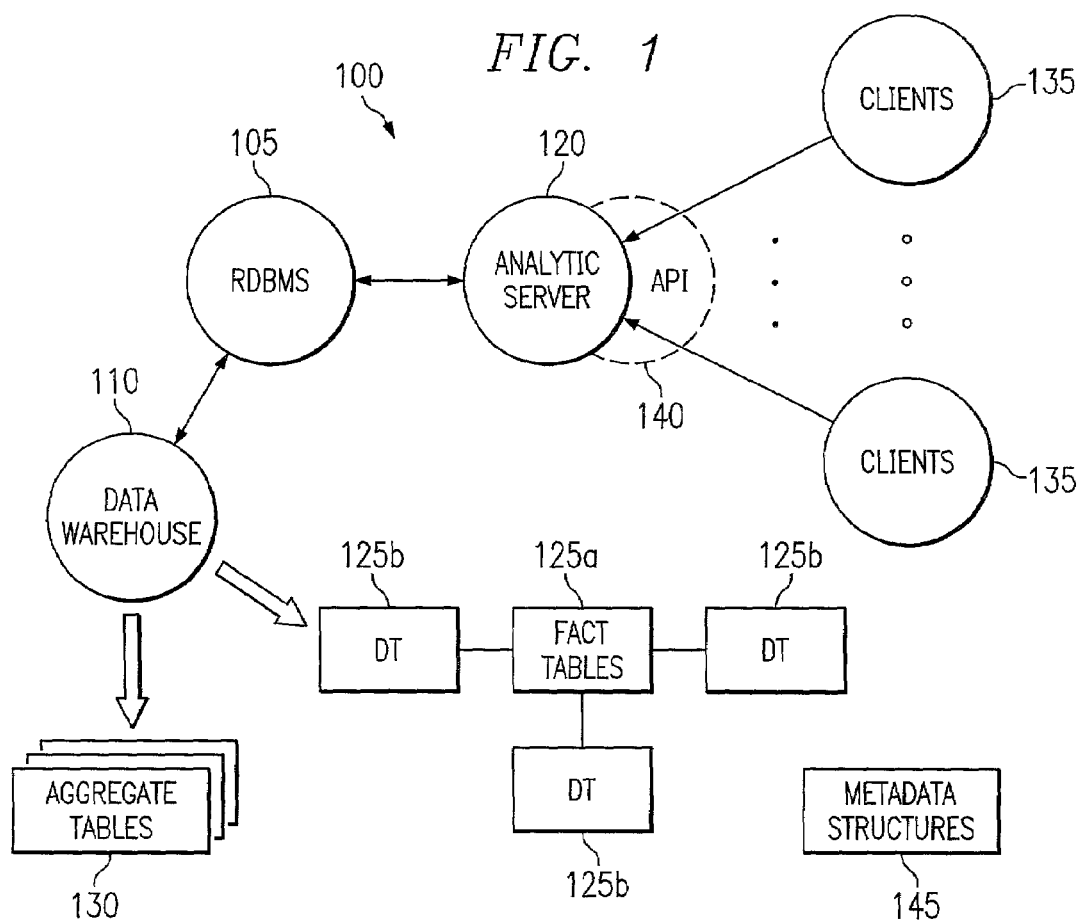
FIG. 1 is a block diagram describing an exemplary computer architecture.

Referring now to FIG. 1, there is illustrated a block diagram describing an exemplary computer architecture 100, configurable in accordance with an embodiment of the present invention. The computer architecture 100 comprises a relational database management system (RDBMS) 105, a database or data warehouse 110, an interface 140, and an analytical server 120.

The database 110 is accessible by the analytical server engine 120. The analytical server engine 120 accepts requests for metric calculations from clients 135, uses the metadata structures 145 to identify the necessary fact components and the best star schema for accessing them, generates and executes structured queries in a database query language, such as Structured Query Language (SQL), performs outer joins to conform query results, calculates the desired metrics, and returns them to the clients in a structured form such as multidimensional cubes.

The clients access the analytical server via an application programming interface (API) 140, through which metrics can be requested, possibly constrained on dimensional values. The query and metric calculation results are transmitted through the interface as objects. The client need not have knowledge of how the metric is calculated.

The database 110 includes a collection of base_fact tables 125a and dimension tables 125b organized in multiple star schemas 125. Exemplary star schemas are described in Ralph Kimball, THE DATA WAREHOUSE TOOLKIT (John Wiley & Sons 1996), which is hereby incorporated by reference for all purposes. Additionally, the database includes aggregate fact tables 130. The aggregate_fact tables 130 contain values summarized from the base_fact tables 125a to certain specified levels of one or more dimensions. An aggregate fact table 130 is more efficient and preferable to access than a base_fact table 125a, provided the level of detail of a given aggregate_fact table 130 is still sufficient for a given query. Additionally, a set of metadata structures 145 describe the contents of, and relationships between, the various fact and dimension tables 125a,125b.

The metadata structures 145 provides information for the analytical server 120 to determine how to access the database 110 for the values required to construct requested metrics and defines more abstract constructs, such as particular metrics which can be computed from one or more facts in the database 110. As will be described below, the metadata structures 145 include structures for hierarchies, stars, measure indicators, and metric indicators.

I. Metadata Structures

A. Hierarchies

Figure 2:
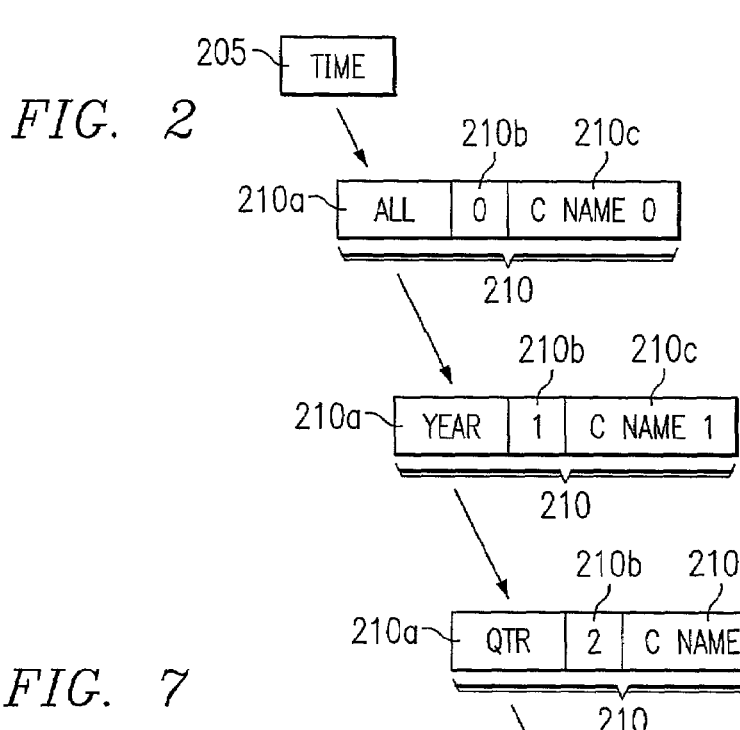
FIG. 2 is a block diagram of a metadata structure for a hierarchy.

Referring now to FIG. 2, there is illustrated a block diagram of a metadata 145 structure known as a hierarchy 205. A hierarchy 205 defines levels 210 with a minimum of two levels. The top level encompasses all elements, while successive levels further subdivide the elements into one or more non-overlapping groups.

Each level 210 is associated with a level name 210a, level number 210b, and column name 210c. The level names describe the grouping of the elements. In the exemplary case described in FIG. 2, the level names include "all," "year," "quarter," "month," "week," and "day." The level number 210b starts with 0 for the top level 210 and increases sequentially for each deeper level. The column name 210c is used to find the attribute values for the level in any table in the database which supports the hierarchy. For example, the column name 210c for the "quarter" level 210b may be used to find the attributes specifying the quarters of a particular database year.

For a dimension table 125b to be associated with a hierarchy 205, the dimension table 125b must contain the column names 210c specified for the hierarchy 205 for the levels 1 . . . n. Multiple dimension tables 125b may be associated with the same hierarchy 205 and support it to different levels. For example, a dimension table 125b for Time might contain columns only for Year, Quarter, and Month, and therefore provided a supported level of "3," while a more complete dimension table might contain columns for all levels down to "day," and therefore offer a supported level of "5."

B. Stars

Figure 3A:
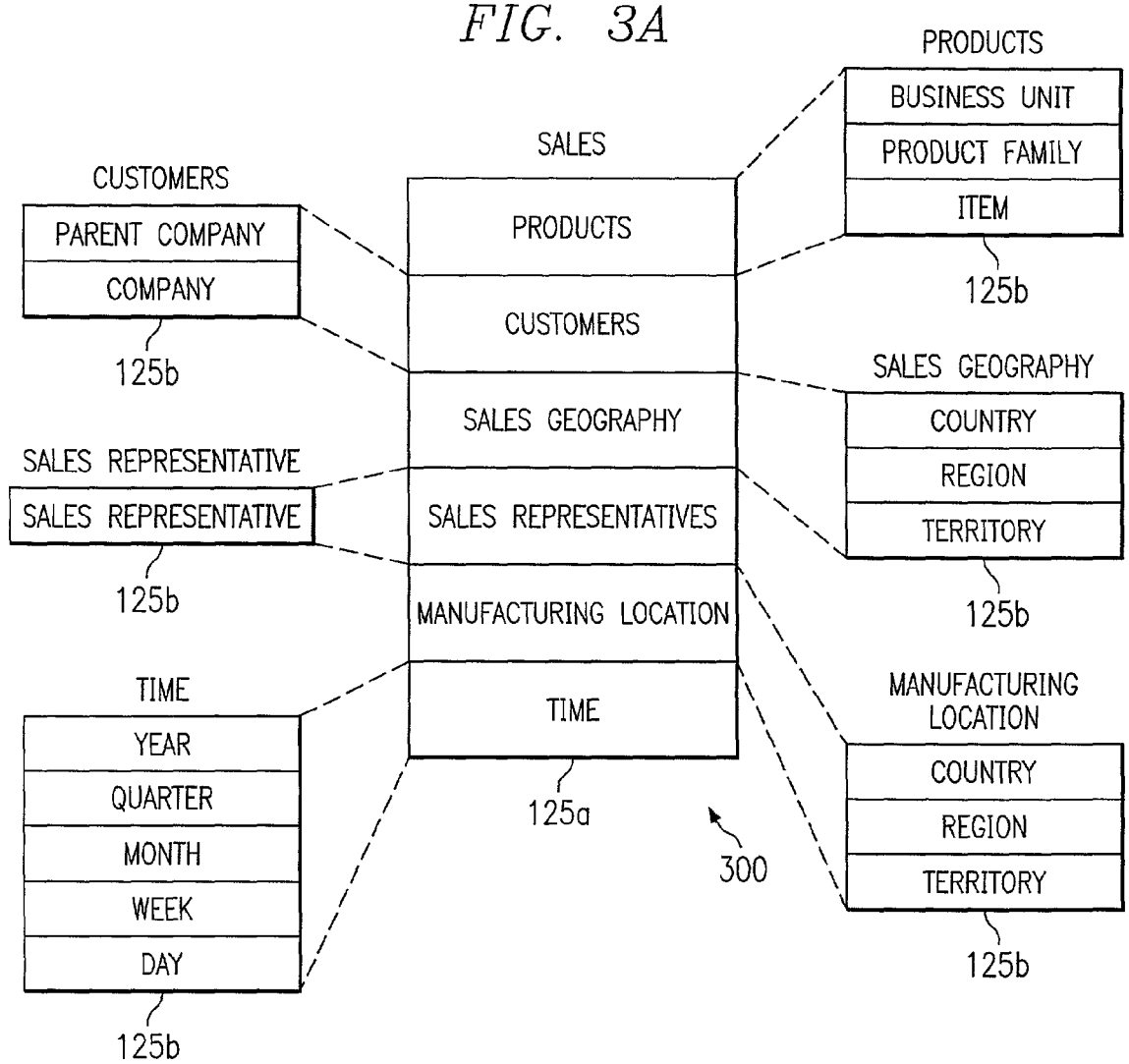
FIG. 3A is a block diagram describing a star schema.
Figure 3B:
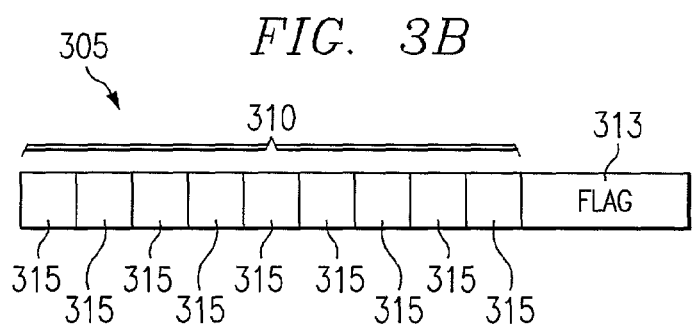
FIG. 3B is a block diagram of a metadata structure for a star.

FIG. 3A illustrates a star schema dimensional model, and FIG. 3B provides a block diagram of an exemplary metadata structure for a single star within the database.

As shown in FIG. 3A, a star 300 has a single fact table 125a having a number of records along multiple dimensions, which dimensions in turn point to corresponding dimension tables 125b. The fact table may be either a base level or aggregate level fact table. As shown in FIG. 3A, the fact table 125a, for example, may be a "Sales" fact table, which may in turn have facts in six defined dimensions: Products, Customers; Sales Geography; Manufacturing Location; Sales Reps; and Time. These dimensions will in turn refer to the dimension tables 125b, which may be conceptually viewed as surrounding the fact table 125a. Exemplary hierarchical levels maintained within the dimension tables 125b are also shown in FIG. 3A.

The star 300 comprising the fact table 125a and the surrounding dimension tables 125b can be used to apply selection constraints and specify aggregate groupings when retrieving the fact values. A number of different stars can be identified in a database.

A star metadata structure 305 such as shown in FIG. 3B can be used to describe the various stars in a database. Each star metadata structure 305 identifies an fact table 130 in the database from which values designated as facts may be obtained. For each supported hierarchy 205 (see FIG. 2), the star 300 identifies a specific dimension table 125b to be used for performing hierarchical selection and grouping, and provides to the querying language (such as SQL), a constraint used to join the dimension table 125b to the fact table 125a.

The supported levels of the specific fact table 130 in the database are represented in a star metadata structure 305 by an array 310 of dimension indicators in which each dimension indicator 315 of the array 310 represents the supported hierarchical levels defined in a predetermined order. Additionally, an initialization process might ensure that the supported levels 210 are valid in all stars 300, thereby eliminating the need for checking the column names during the star selection process.

Still referring to FIG. 3B, within each star metadata structure 305, a supported level 210 value is tracked for each dimension, specific to the star 300 and usually depending on the level 210 of data aggregation in the associated fact table. For example, in FIG. 3A, the time dimension has been summarized to the "day" level, so the supported level 210 for Time in this particular star 300 will be "5," while some other star containing only month-level fact values would support Time to level 3. If no dimension table 125b has been assigned for some hierarchy 205, then hierarchy 205 is not supported by the star 305 and the supported level is recorded as "0."

The star metadata structure 305 may also include a flag 313 indicating the availability of the star 300. Where the star is properly maintained or refreshed by some other mechanism, the flag 313 can be set to indicate whether the data in the star is available. The foregoing flag 313 can be examined during star selection.

The stars 300 are collected into groups called stargroups. Aggregate_fact tables 130 are built for frequently accessed data, in a manner that reduces table size, join complexity, a query time. For example, sales figures might be accumulated at the "day" level in one aggregate_fact table 130, and summarized more highly to the "month" level in some other aggregate_fact table 130. The stargroup used for accessing sales figures might contain two stars 300, possibly using exactly the same dimension tables 125b but each pointing to different aggregate_fact tables 130. The star 300 using the monthly aggregate_fact table 130 would be assigned a higher aggregate rank, or in other words would contain measures at a higher hierarchical level, and would be preferred when values were not required at a finer grain than month.

C. Measure Indicator

Figure 4:
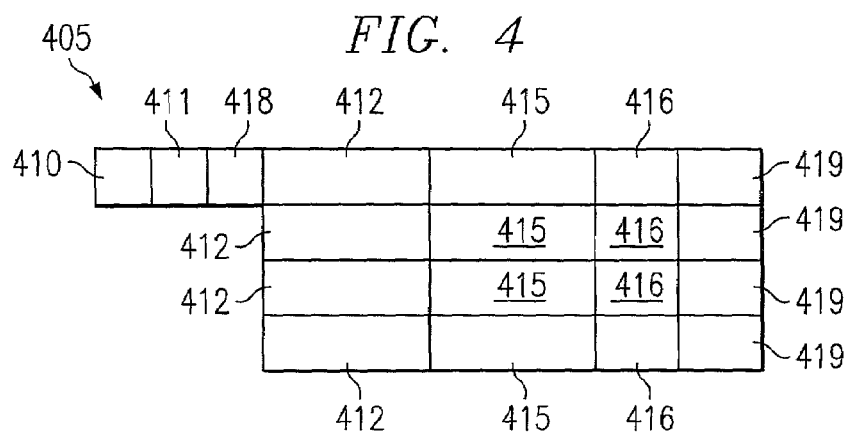
FIG. 4 is a block diagram of a metadata structure for a measure indicator.

Referring now to FIG. 4, there is a block diagram of another metadata structure 145, specifically a measure indicator 405. The measure indicator 405 identifies and describes a measure, which is a value that can be obtained directly from the database 110.

The measure indicator 405 includes an identifier 410, which identifies the facts within the database 110 that are being referred to. Also included in the measure indicator is a flag 411 which indicates whether or not the measure is additive. The measure indicator 405 also contains a query language snippet 412. To support aggregate navigation, the snippet 412 is defined using a syntax which allows substitution of specific fact table 125a names and dimension table 125b names. For example, a non-SQL character is used to delimit a substitutable form which is to be replaced by the name of the fact table in the associated star, prior to executing a query.

Additionally, different stargroups may require that the snippet 412 be written differently. Accordingly, a measure may contain a plurality of snippets 412, each associated with an indicator 415 indicating a particular stargroup. Verification that the columns specified in the snippets 412 actually appear in the fact tables 130 defined by each star 300 in the associated stargroup can be done during an initialization process, thereby limiting column name lookups.

Use of multiple snippets 412 for different stargroups are advantageous for calculation of chameleon metrics. Chameleon metrics represent a general concept, the exact definition or calculation of which is dependent on the dimension or level. For example, a cost metric when viewed by the product dimension, may measure production or part cost. However, when viewed by dimensions other than product, the cost includes the total product cost across all parts, freight, taxes, and other top-level costs.

Chameleon metrics are constructed by taking advantage of the provision for multiple snippet 412/stargroup pairs in the underlying measure definitions. Using the Geography vs. Product forecast example, a measure is defined which uses two different stargroups. The snippet 412 associated with the first stargroup can cause the measure to be calculated in accordance with a first definition while the snippet 412 associated with the second definition cause the measure to be calculated in accordance with a second definition.

Fact-based redundancy can also be provided, for example, by providing additional security hierarchy fields 418, 419 within the measure indicator 405. By defining for particular measures a security hierarchy, it is possible to grant access to particular users or clients according to levels of fact-based data by defining security hierarchy levels on a measure-by-measure basis. For ultimate flexibility, the security hierarchy is defined in the measure indicator both at the broad level in field 418 and at the specific snippet level 419. The definition at these different levels allows the facts to be accessed according to the measure's use within the star structure 300 or fact table 130 being accessed rather than just having a broad prohibition of accessing certain types of data by certain users or clients.

D. Metric Indicators

Figure 5:
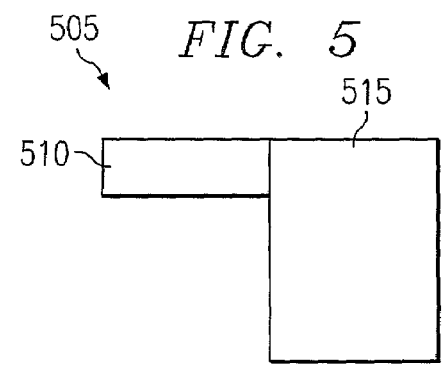
FIG. 5 is a block diagram of a metadata structure for a metric indicator.

Referring now to FIG. 5, there is illustrated a block diagram describing a metric indicator 505. The metric indicator 505 includes a metric name 510 identifying a particular metric. The metric name 510 is used in requesting results from the analytical server 120. The metric indicator 505 also includes identifiers 515 identifying measures and the operations to be performed thereon, to calculate the value of the metric. Although the measures are obtained from the database 110 from any number of database queries, the metrics are calculated at the analytical server 120 after obtaining each measure.

II. Metric Calculation

A. Aggregate Navigation

Figure 6:
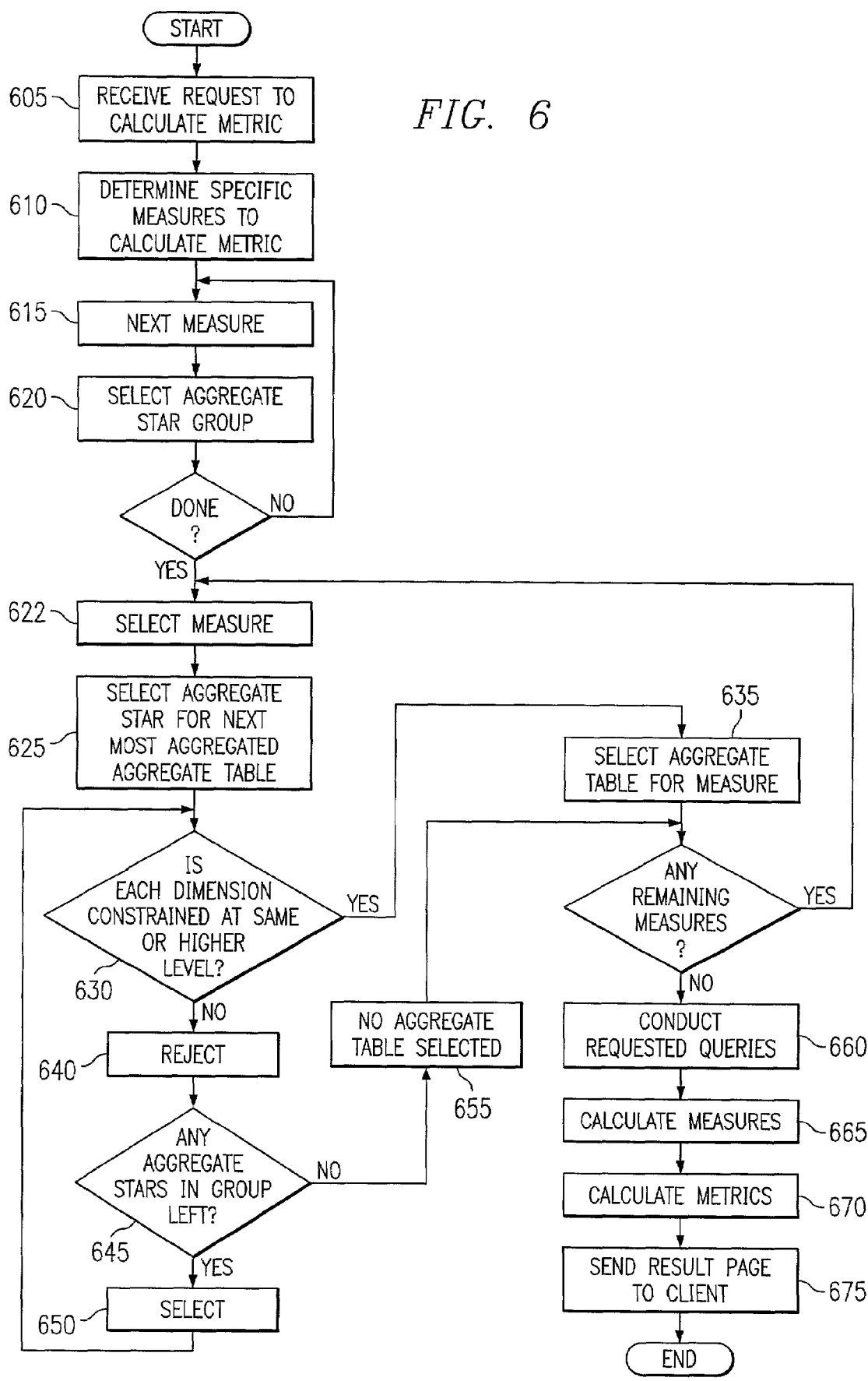
FIG. 6 is a flow diagram describing calculation of a metric.

Referring now to FIG. 6, there is illustrated a flow diagram describing the calculation of a metric at an analytical server 120. At step 605, the analytical server 120 receives a request to calculate a particular metric. After receiving the request to calculate the particular metric, the analytical server 120 determines the specific measures required for calculating the metric from the metric indicator 515 (step 610). For each measure (step 615), the analytical server 120 selects the aggregate stargroup (step 620).

At step 622, the analytical server 120 selects a particular measure and associated stargroup. Within the aggregate stargroup, the analytical server 120 selects (step 625) the star 300 associated with the most highly aggregated fact table 130 and determines whether the star supports each constrained dimension at the level required. The foregoing is measured by comparing (step 630) the requested level for each dimension in the metric request with the array 310 of dimension indicators 315 describing the supported levels 210 of the dimensions. Wherein the array 310 indicates that the requested level for each dimension is supported at the same or higher level, the star 300 is selected (step 630).

Wherein one or more requested levels of dimensions are not supported, or supported at a lower level, the fact table 130 associated with the star 300 is rejected (step 635), and a determination is made whether any remaining stars 300 are present in the stargroup. Wherein a remaining star 300 exists in the stargroup, the star 300 associated with the next most highly aggregated table 130 is selected (step 650) and steps 630–650 are repeated. Wherein there are no remaining stars 300, data may not be obtained for the particular measure (step 655). Steps 622–655 are repeated for each measure required for the requested metric(s).

After selecting the star 300, the analytical server 120 generates and conducts the queries for each measure on the selected tables 130 (step 660). The queries are generated by substituting the fact 125a and dimension table 125b names where indicated in the snippets 412 associated with the selected star 300. After generating the queries, the analytical server 120 calculates the measures (step 665), calculates the metrics (step 670), and forwards the result to the client (step 675), thereby completing calculation of the metric.

The foregoing approach also permits maintenance of statistics which indicate the usage levels of each star 300. For example, statistics can monitor events such as when a star 300 is considered for selection and rejected, a star 300 is selected for use, and when a star 300 is actually used in a query. The required and supported hierarchical levels can also be recorded, thereby permitting examination of usage levels. From the foregoing information, it can be determined in a given circumstance that an additional level of detail should be added to the aggregate_fact table 130 because a majority of requests required the additional hierarchical level. Additionally, a determination can be made that the aggregate_fact table 130 can be consolidated without major effect on overall performance because a majority of requests require one less level of detail.

B. Combining Queries

Certain queries can be conducted using a common fact table 130. For example, certain fact tables 130 can include multiple aggregated facts. Wherein multiple queries request different measures, but with identical constraints, the aggregated facts can be combined into a single structured query, such as a SELECT statement in SQL. Alternatively, where in multiple queries, all but one constraint are identical, and the different constraint is constrained at the same level, the queries can also be combined.

The analytical server 120 can advantageously preprocess the requisite queries, possibly allowing a number of queries to be combined into a single query, resulting in relational database 110 access efficiencies.

Figure 7:
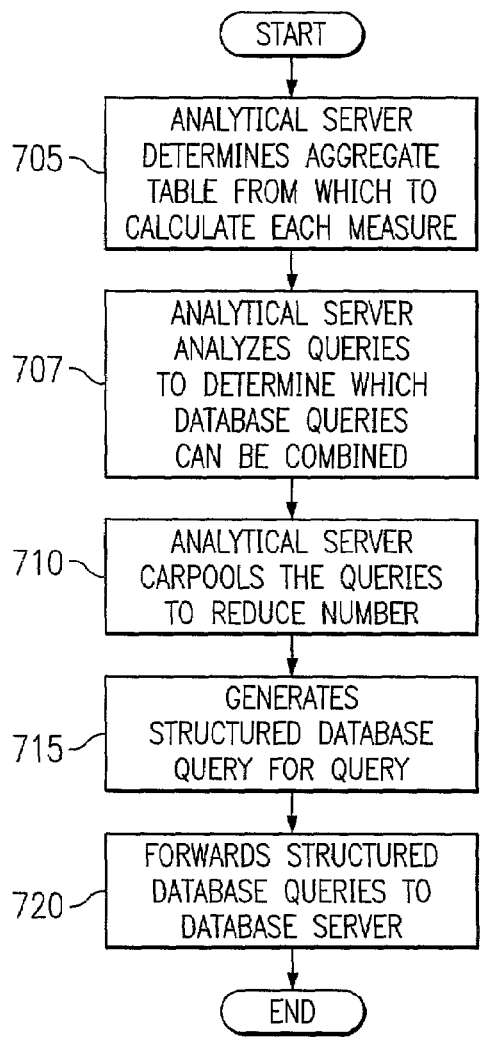
FIG. 7 is a flow diagram describing carpooling.

Referring now to FIG. 7, there is illustrated a flow diagram describing the operation of the analytical server 120 conducting queries, wherein the queries may be combined due to there being a number of queries seeking metrics along the same dimension broken down, preferably, to the same hierarchical level. The combining of the queries reduces database load and in many cases improves database response time.

At step 705, the analytical server 120 determines the fact table 130 from which to calculate each measure. At step 707, the analytical server determines which of a plurality of queries can be combined when accessing the database 110. In order to combine queries, the same base fact table 125*a* is common between the queries to be combined, and there will be commonality to at least some of the dimension tables 125*b* between the queries as well. The queries can be combined for a single star or among a number of stars 300, so long as there is the requisite commonality among the fact and dimension tables 125*a–b*. The determination of step 707 involves a determination of the hierarchical levels involved in the plurality of queries, and it is possible that even if a requested metric or metrics requires the same measures but at differing hierarchical levels, it may be possible to consolidate these into a single query of the database 110 and then extract the desired information needed for the different metric requests. For example, if some metric is broken down over the last six months and also for the corresponding six months in the previous year, the underlying measure for both requests can be obtained in a single query, simply by placing all desired month numbers in the "IN (1, m, n)" constraint, and selectively processing the results.

At step 710, the analytical server 120 carpools combinable queries to reduce the number of queries actually made of the database 110 through the RDBMS 105. After carpooling the queries, the analytical server 120 generates the structured query commands for each of the database queries (step 715) and forwards (step 720) the structured database query commands to the RDBMS 105.

C. Non-Additive Metric Calculation

It is noted that it is often desirable to display metrics broken down across dimensional levels, and simultaneously display a roll-up or total. Provided all the measures that have been broken down across dimensional levels are additive, the requestor of the metric can simply total the returned results. However, this is incorrect wherein certain measure components of the metrics are non-additive. Correct totals can only be obtained if the requestor has knowledge of which measures are non-additive and asks for the non-additive measures separately.

By using the additive/non-additive fields 411,416 described with respect to FIG. 4, it is possible for the analytical server 120 to readily determine which measures are non-additive. By making this determination, the analytical server can allow the rollup to be handled transparently without making the non-additive attributes visible to the requester. This is accomplished by extending the metric result to contain an additional multidimensional array of totals. The additional multidimensional array of totals may include or be based upon measures at different hierarchical levels than were necessary for the original (non-rollup) calculation. Alternatively, the original three-dimensional cube might simply reserve one extra element in the first dimension to contain the totals. Maintaining metadata 145 describing the hierarchical levels of the fact tables 130 allows for an efficient implementation of the transparent non-additive metric calculations described above.

Figure 8:
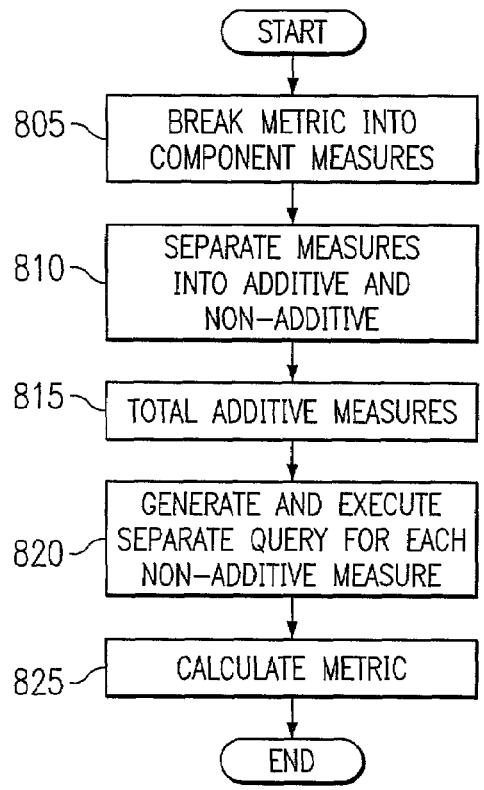
FIG. 8 is a flow diagram describing a rollup of a metric.

Referring now to FIG. 8, there is illustrated a flow diagram describing a rollup of a metric. At step 805, the metric is broken down into its component measures. At step 810, the component measures are separated into two groups or are conceptually treated as two groups, according to the additive/non-additive flags 411,416 (see FIG. 4). To the extent the rollup can be done for the additive measures without additional difficulty, this summing is done at step 815.

At step 820, a separate totals query is generated for each non-additive measure. The query is launched using the stars as described above, and it is noted that the totals query typically requires a shallower hierarchical level on at least one dimension. Accordingly, the totals query may actually be obtained using a more highly aggregated table. Finally, at step 825, the metric is calculated and the process is terminated. In the foregoing manner, complex metrics composed of any combination of additive and non-additive measures can be calculated correctly and efficiently, without requiring any knowledge or action on the part of the requester.

Since the analytical server 120 knows which measures are additive and non-additive, the analytical server is able to adapt its inquiries and displays to minimize the possibility of displaying invalid results.

In the simple case where it turns out all component measures are additive, the analytical server 120 issues queries at the detail level only (business unit), and performs simple sums to calculate the totals. The individual measures are summed, and then the metric level calculations are performed using these sums.

When a measure is non-additive, the analytical server 120 instead generates and issues two separate queries, the extra query being for the total level (omitting the SELECT item and GROUP BY for Business Unit). In this way, complex metrics composed of any combination of additive and non-additive measures can be calculated correctly and efficiently, without requiring any knowledge or action on the part of the requester. The additive/non-additive fields 411, 416 (see FIG. 4) are provided within the measure metadata structure to assist the analytical server 120 in determining whether certain measures or additive or not along certain dimensions.

As an additional benefit, there may be cases where no star is available at a certain hierarchical level, in which case the analytical server 120 may attempt to obtain the measures and calculate the metric at the total level only (even in the case where the measures are all additive). This can be done, for example, when the intention is to compare two metrics, such as sales vs. forecast, as when sales can be broken down by industry, customer, etc. but forecast is only available by product. In this case, forecast could still be compared to total sales across all industries or customers. To best support this capability, the server further extends the result object to provide indicators distinguishing such indicators as "all zero results", "no data found", "detail level not supported", and so forth.

D. Cross Star Joins

Many metrics must be calculated using measures obtained from different stars. For example, a metric which measures the average numbers of days that inventory will last (inventory days on hand) is calculated by dividing the current inventory by the sales per day. Wherein one star measures sales and another star measures inventory, calculation of the inventory days on hand requires calculation of measures from both the sales star and the inventory star.

The analytical server 120 accesses the measures separately from each star 300, and then performs the equivalent of an outer join on the results. The different sets of results along the hierarchical level supplied in the request and retrieved by the queries are carefully "lined up", thereby allowing the server 120 to encapsulate this knowledge and processing, and make sophisticated metrics available to the requester.

E. Invariant Metrics

Certain measures or metrics are "invariant" by dimension. For example, to calculate the metric sales per sales rep, a measure must exist for the denominator which gives the number of sales reps. Furthermore, it may be useful to look at the sales per rep metric broken down by product business unit, family, or item. If the number of sales reps is maintained in a sales forecast star, it can be accessed only by sales geography and time. However, since all reps sell all products, the measure reporting number of reps does not change whether looking at the business unit, family, or item level, the number of sales reps is invariant along the product dimension. Therefore, the sales forecast star is degenerate along the product dimension. The analytical server is equipped with knowledge of measures which are invariant with respect to certain dimensions. Providing this knowledge to the analytical server allows a single value to be obtained as the invariant measure in the metric calculation, regardless of the level of the dimension to which the measure is invariant.

F. Allocation Metrics

An allocation metric is a metric containing a measure that is not defined at the lowest dimension level, but which is useful and desirable to allocate a value for the metric at the lowest dimension using another measure which is definable at the lowest dimension. For example, Sales Forecast numbers may be available by Geography, Sales Rep, and Time, but not by Product Business Unit. However, suppose that Sales for the previous year are available by Product Business Unit and that it is a reasonable assumption that the breakdown of Sales by Product Business Unit will be similar to the breakdown of Sales Forecast by Product Business Unit. In such a case, the Sales Forecast by Product Business Unit can be calculated by the foregoing expression:

Allocated Forecast for Product(A)=Total Forecast*Sales for Product(A) Last Year

Total Sales Last Year

In the following case, the measure "Forecast Sales" is the base measure while "Sales Last Year" is known as the control measure. Additionally, it should be noted that while Sales for Product(A) is at the same level as the request, i.e., at the Product Business Units level, the measures of Total Forecast and Total Sales Last Year are obtained at different levels, or "allocated levels".

Figure 9:
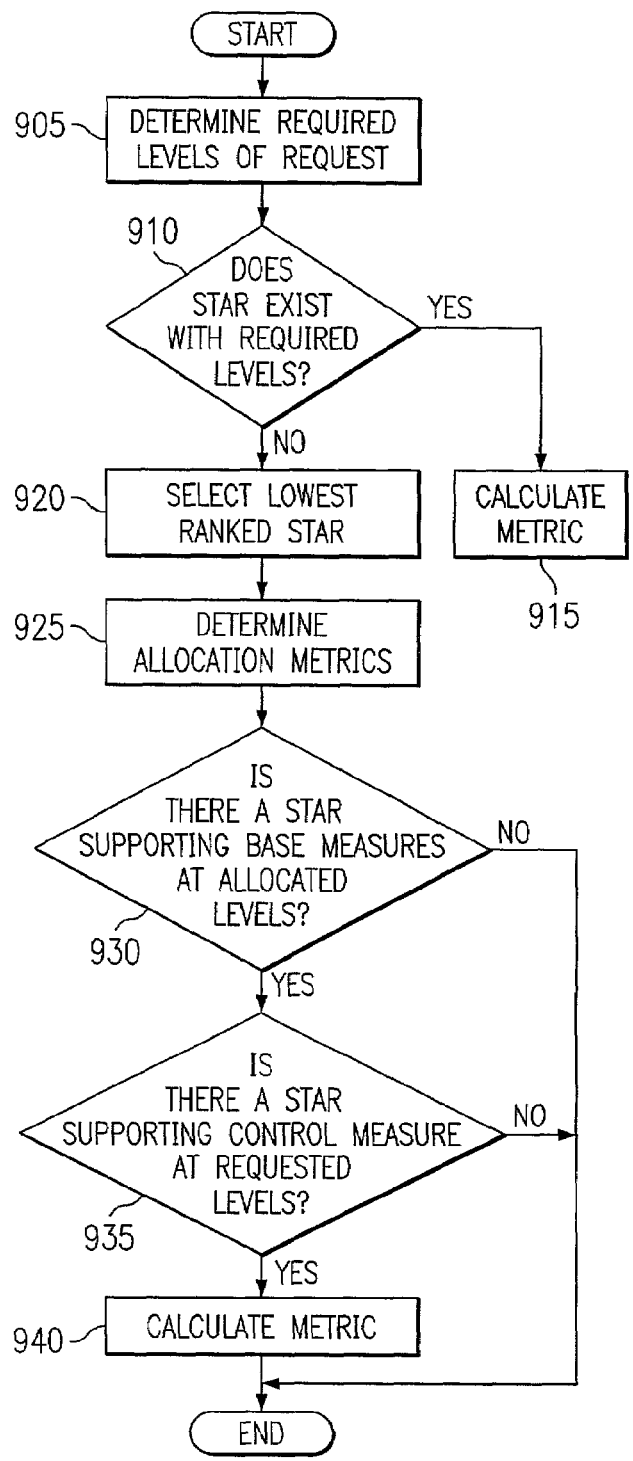
FIG. 9 is a flow diagram of the calculation of an allocation metric.

Referring now to FIG. 9, there is illustrated a flow diagram describing calculation of an allocated metric. The calculation of an allocated metric will be described using an exemplary case wherein a request is made for Forecasted Sales by Quarter, and Business Unit, across All Geographies. The supported levels of the stars 300 are described in the following dimension order: Time, Product, and Geography. The Time dimension is ordered from All, Year, Quarter, Month, Week, and Date. The Product dimension is ordered from All and Business Unit. The Geography is ordered from All, Continent, Country, State, and City.

At step 905, the required levels for the request are determined. In the exemplary case, the required levels are "210." At step 910, a determination is made whether a star exists with the required levels. As an example, the star metadata structure 305 shown in FIG. 3 could be used to store, in a defined fashion in the array 310 of integers, the available hierarchical levels within a given star. If a star exists having the required levels, the metric is calculated (step 915) directly and the process is terminated. Wherein a star does not exist, the best data available for the base measure (Sales Forecast), which is simply the lowest ranked star in the stargroup, is selected (step 920).

In the exemplary case, the lowest ranked star is ranked as "303" which fails on the Product dimension. At step 925, the allocation levels are determined by taking the minimums of the required levels for the request and the levels of the star selected during step 920. The allocation levels are "200" in the exemplary case.

During step 930, an attempt is made to find a star which supports the allocation levels in the base measure, e.g., the sales forecast in the present exemplary case. During step 935, an attempt is made to find a star in the control measure (the Sales Last Year) which support the required levels for the request ("210"). Wherein a star for the base measure is found in step 930 and a star for the control measure is found in step 935, the allocated measure is calculated (step 940), thereby completing calculation of the metric. Wherein a star is not found in either steps 930 or 935, the allocated measure cannot be calculated and calculation of the metric is terminated.

III. Security

A. Dimension Level Security

Data security is provided on both a dimension level and a fact level. Each authorized user of the database can be associated with a particular security level which restricts the levels of each hierarchy which the user is permitted access. For example, regional sales managers can be permitted to only view sales at the regional level and not be authorized access to sales data at the national or worldwide level. Additionally, the users can be restricted access to a particular value of a hierarchical level. For example, a regional sales manager might be permitted to only view sales data from their region.

The dimension level security is provided by defining security groups which specify that all metric requests have to be performed as if the required level of a certain hierarchy is at least some predetermined level. The request is rejected outright if any of the requested levels are lower than the security levels. The security definitions can also contain rules which force certain constraints. The force constraints are dynamically substituted to a given request.

B. Fact Level Security

It may also be desirable to prevent users from viewing specific metrics. An additional two level hierarchy is defined, wherein level zero is indicative that the data should not be visible, while level one is indicative that the data should be made visible. The supported level for the added hierarchy is set at zero for each restricted metric and one for each unrestricted metric. Users who are restricted are placed in a security group that only permits access to level one of the hierarchy. Therefore, when a restricted user makes a query for the restricted metric, the security definition imposes a dimensional constraint of one for the additional hierarchy. During aggregate navigation, each of the stars will be rejected because the stars only support a level zero aggregation. For users who are permitted to access the restricted metric, the zero level dimensional constraint is imposed, however each of the stars support the zero level aggregation.

IV. Graphical User Interface

As noted above, the analytical server 120 generates queries which are requested from the clients 135. The results of the query are forwarded to the clients via the API 140. Requests are also forwarded from the clients 135 to the analytical server 120 via the API 140. Communication of the requests from the clients 135 and the results from the analytical server 120 is facilitated by generation of a graphical user interface. The graphical user interface is displayed at the client 135 and facilitates transmission of requests for queries and displays the results of the queries.

Figure 10:
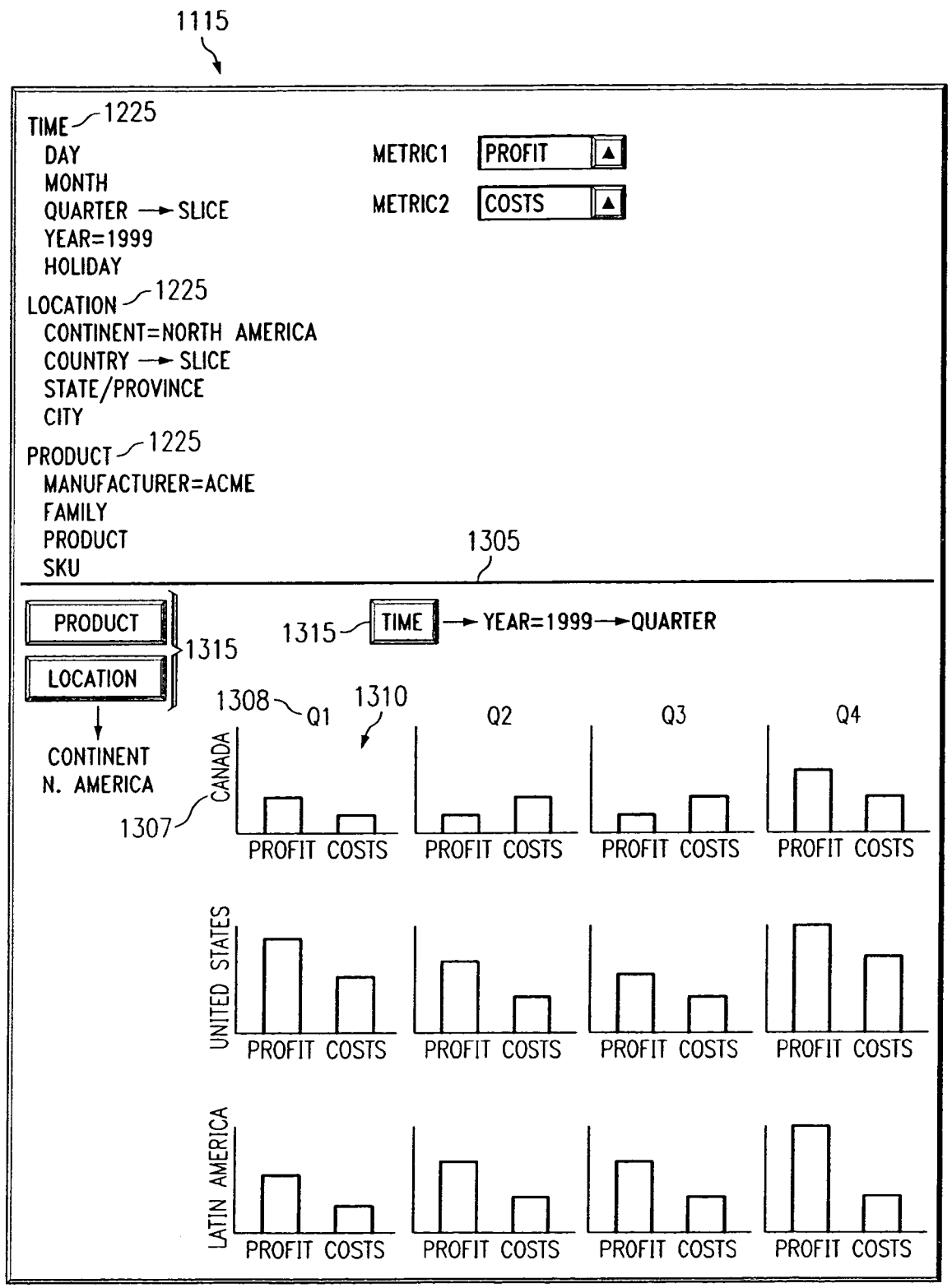
FIG. 10 is a block diagram describing an exemplary graphical user interface.

Referring now to FIG. 10, there is illustrated a block diagram of the GUI 1115. The GUI 1115 includes a hierarchical listing of each of the dimensions 1225. The user can click on a particular dimension 1225 and view metrics calculated for the constraint, as well as the lower levels of the dimension hierarchy. For each dimension, the user can either select a lower level or select a constraint to constrain the dimension. Additionally, the graphical user interface includes a set of metric buttons, wherein each metric button is associated with a predefined metric.

By constraining the dimension and selecting a metric, the user can have the metric calculated for the records with the selected constraints. The user can click a query button and have constraints and selected metric forwarded to the analytical server 120. The analytical server 120 generates a structured query, transmits the structured query to the database server 105, receives the results of the query. Upon receiving the results of the query, the analytical server 120 calculates the selected metric, and prepares an object encapsulating the calculated metric for display in the GUI 1115. The retrieved data is displayed in the form of a results page 1305. The results page includes rows 1307 and columns 1308 of graphs 1310. Each single graph 1310 can plot any number of metrics, such as profits and costs against the vertical axis. Each row 1307 of graphs 1310 can represent metrics pertaining to each of the different values which comprise a level of a dimension 1220, known as a slice. For example, each row could represent the metrics pertaining to a different country in the location dimension. Each column can represent a different quarter.

The GUI 1115 also includes a navigation bar for changing the dimension with an indicator button 1315 for each dimension. The user can change the dimension displayed, known as slicing, by clicking on the appropriate indicator button 1315. For example, the user can view the profits and costs from product to product by simply clicking on the product dimension indicator button 1315.

Additionally, the user can also traverse the levels of a dimension. For example, the user may wish to review graphs of metrics involving the various provinces of Canada. By clicking on the graph 1310 in the row representing the Canada, the user can then review graphs for the provinces of Canada. Alternatively, the user may wish to review graphs from a higher level in the location dimension, e.g., continent. To review the graphs 1310 on a higher level of the same dimension, the user clicks on the location dimension indicator button 1315.

Figure 11:
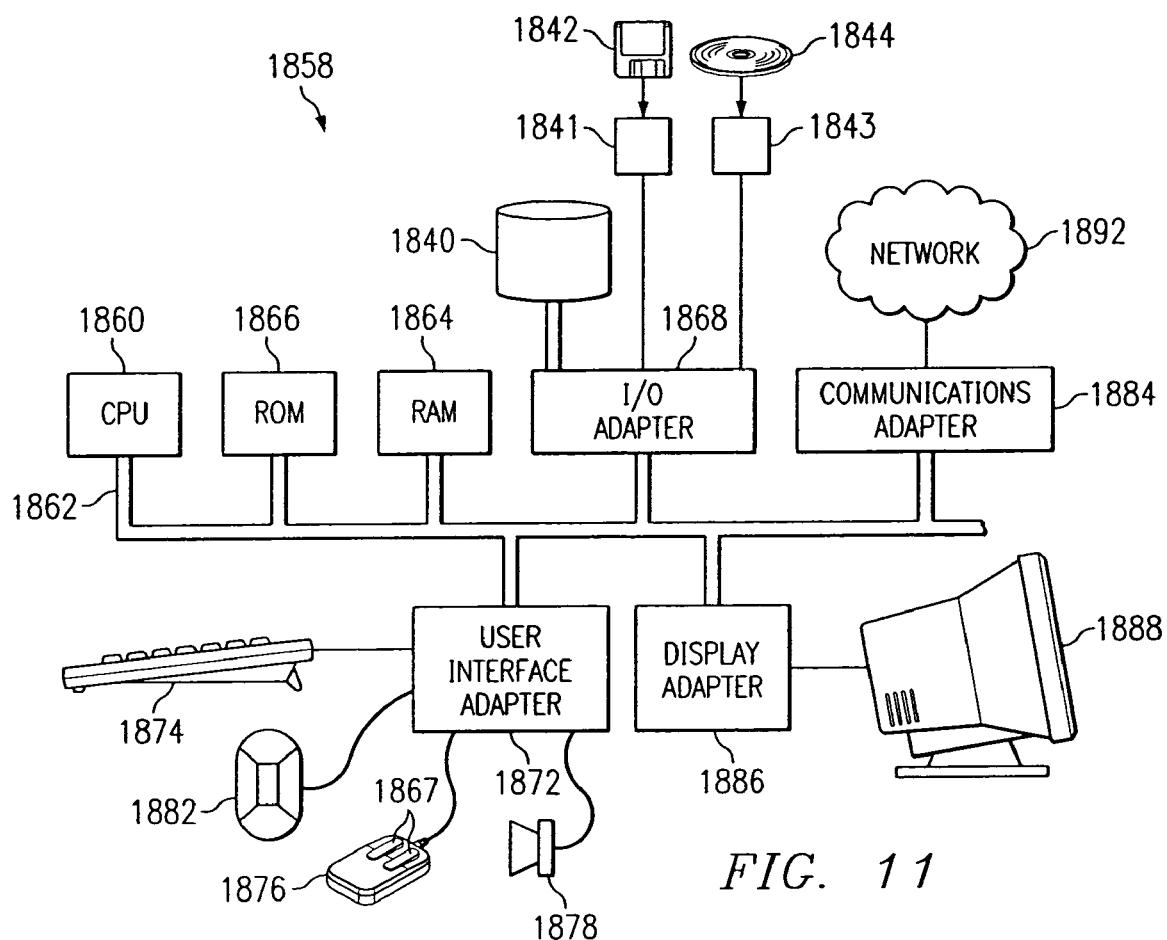
FIG. 11 is a block diagram describing an exemplary hardware environment wherein the present invention can be practiced.

Referring now to FIG. 11, a representative hardware environment for practicing the present invention is depicted and illustrates a typical hardware configuration of a computer system in accordance with the subject invention, having at least one central processing unit (CPU) 1860. CPU 1860 is interconnected via system bus 1812 to random access memory (RAM) 1864, read only memory (ROM) 1866, and input/output (I/O) adapter 1868 for connecting peripheral devices such as disc units 1870 and tape drives 1890 to bus 1862, user interface adapter 1872 for connecting keyboard 1874, mouse 1876 having button 1867, speaker 1878, microphone 1882, and/or other user interfaced devices such as a touch screen device (not shown) to bus 1862, communication adapter 1884 for connecting the analytical server to a data processing network 1892, and display adapter 1886 for connecting bus 1862 to display device 1888.

In one embodiment, the invention can be implemented as sets of instructions resident in the random access memory 1864 of one or more computer systems configured generally as described in FIG. 11. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information.

Although preferred embodiments of the present inventions have illustrated in the accompanying Drawings and described in the foregoing Detailed Description, it will be understood that the inventions are not limited to the embodiments disclosed, but are capable of numerous rearrangements, modifications and substitutions without departing from the spirit of the invention as set forth and defined by the following claims and equivalents thereof.

What is claimed is:

1. A method for restricting access to information in a dimensional database, the dimensional database having dimension tables, fact tables, and metadata describing the fact tables, said method comprising:

receiving a request from a requestor, said request associated with a plurality of request levels of a corresponding plurality of dimensions and said request associated with at least one fact, the request levels being levels of dimensional hierarchies and the requestor having a security designation; and providing security measures at each of a dimension level and a fact level of the database, wherein providing security at the dimension level comprises:

comparing each of the plurality of request levels with each of a corresponding set of security levels, the security levels restricting the levels of each dimensional hierarchy to which the requestor is permitted access;

and wherein providing security at the fact level is distinct from providing security at the dimension level and providing security at the fact level comprises:

defining a security level for the at least one fact, wherein the security level for the at least one fact is stored as metadata in the database; and comparing the security level for the at least one fact with the security designation of the requestor, the security designation restricting the facts to which the requestor is permitted access.

2. The method of claim 1, further comprising:
retrieving the set of security levels from a plurality of sets of security levels, wherein each of the plurality of sets of security levels are associated with at least one requestor.

3. The method of claim 1, further comprising:
generating a query for the request with the request levels, wherein each of the plurality of request levels are equal or exceed each of the corresponding of security levels; and
generating a query with at least one of the security levels, wherein at least one of the security levels exceeds a corresponding one of the request levels.

4. The method of claim 1, wherein the request is associated with one or more request constraints, and further comprising:
retrieving one or more security constraints; and
comparing each of the request constraints to a corresponding one of the security constraints.

5. The method of claim 4, further comprising:
generating the query wherein each of the request constraints is equivalent to the corresponding one of the security constraints; and
denying the request, wherein one of the request constraints is different from the corresponding one of the security constraints.

6. The method of claim 1, further comprising:
determining whether the requestor is in a restricted group;
wherein the requestor is in a restricted group, adding a request level to the request, wherein the added request level indicates that the requestor is in the restricted group; and
wherein the requestor is in an unrestricted group, adding request levels to the request, wherein the added request level indicates that the requestor is in the unrestricted group.

7. The method of claim 6, further comprising:
determining one or more measures associated with the request;
selecting a stargroup associated with each of the one or more measures associated with the request, wherein the stargroup further comprises one or more stars; and
comparing each of the requested levels and the added levels to a corresponding plurality of aggregate levels associated with the stars.

8. A computer readable medium for storing a plurality of instructions for restricting access to information in a dimensional database, the dimensional database having dimension tables, fact tables, metadata describing the fact tables, said plurality of instructions comprising:
receiving a request from a requestor, said request associated with a plurality of request levels of a corresponding plurality of dimensions and said request associated with at least one fact, the request levels being levels of dimensional hierarchies and the requestor having a security designation; and
providing security measures at each of a dimension level and a fact level of the database, wherein providing security at the dimension level comprises:
comparing each of the plurality of request levels with each of a corresponding set of security levels, the security levels restricting the levels of each dimensional hierarchy to which the requestor is permitted access;
and wherein providing security at the fact level is distinct from providing security at the dimension level and providing security at the fact level comprises:
defining a security level for the at least one fact, wherein the security level for the at least one fact is stored as metadata in the database; and
comparing the security level for the at least one fact with the security designation of the requestor, the security designation restricting the facts to which the requestor is permitted access.

9. The computer readable of claim 8, wherein the plurality of instructions further comprising:
retrieving the set of security levels from a plurality of sets of security levels, wherein each of the plurality of sets of security levels are associated with at least one requestor.

10. The computer readable medium of claim 8, wherein the plurality of instructions further comprising:
generating a query for the request, wherein each of the plurality of request levels are equal or exceed each of the corresponding set of security levels; and
generating a query with at least one of the security levels, wherein at least one of the security levels exceeds a corresponding one of the request levels.

11. The computer readable medium of claim 8, wherein the request is associated with one or more request constraints, and the plurality of instructions further comprising:
retrieving one or more security constraints; and comparing each of the request constraints to a corresponding one of the security constraints.

12. The computer readable medium of claim 11, wherein the plurality of instructions further comprising:
generating the query wherein each of the request constraints is equivalent to the corresponding one of the security constraints; and
denying the request, wherein one of the request constraints is different from the corresponding one of the security constraints.

13. The computer readable medium of claim 8, wherein the plurality of instructions further comprising:
determining whether the requestor is in a restricted group;
wherein the requestor is in restricted group, adding a request level to the request, wherein the added request level indicates that the requestor is in the restricted group; and
wherein the requestor is an unrestricted group, adding request levels to the request, wherein the added request level indicates that the requestor is in the unrestricted group.

14. The computer readable medium of claim 13, wherein the plurality of instructions further comprising:
determining one or more measures associated with the request;
selecting a stargroup associated with each of the one or more measures associated with the request, wherein the stargroup further comprises one or more stars; and
comparing each of the requested levels and the added levels to a corresponding plurality of aggregate levels associated with the stars.

* * * * *

UNITED STATES PATENT AND TRADEMARK OFFICE
CERTIFICATE OF CORRECTION

PATENT NO. : 7,167,859 B2
APPLICATION NO. : 09/844717
DATED : January 23, 2007
INVENTOR(S) : Shah et al.

It is certified that error appears in the above-identified patent and that said Letters Patent is hereby corrected as shown below:

Column 13, Line 9, Claim 3, insert -- set -- before "of security levels"

Column 14, Line 11, Claim 9, insert -- medium -- before "of claim 8"

Column 14, Line 44, Claim 13, insert -- a -- before "restricted group"

Column 14, Line 48, Claim 13, insert -- in -- before "an unrestricted group"

Signed and Sealed this

Twenty-seventh Day of March, 2007

JON W. DUDAS
*Director of the United States Patent and Trademark Office*